Feb. 15, 1966  J. E. LOOMIS  3,235,105
VEHICLE
Filed July 23, 1958  9 Sheets-Sheet 1
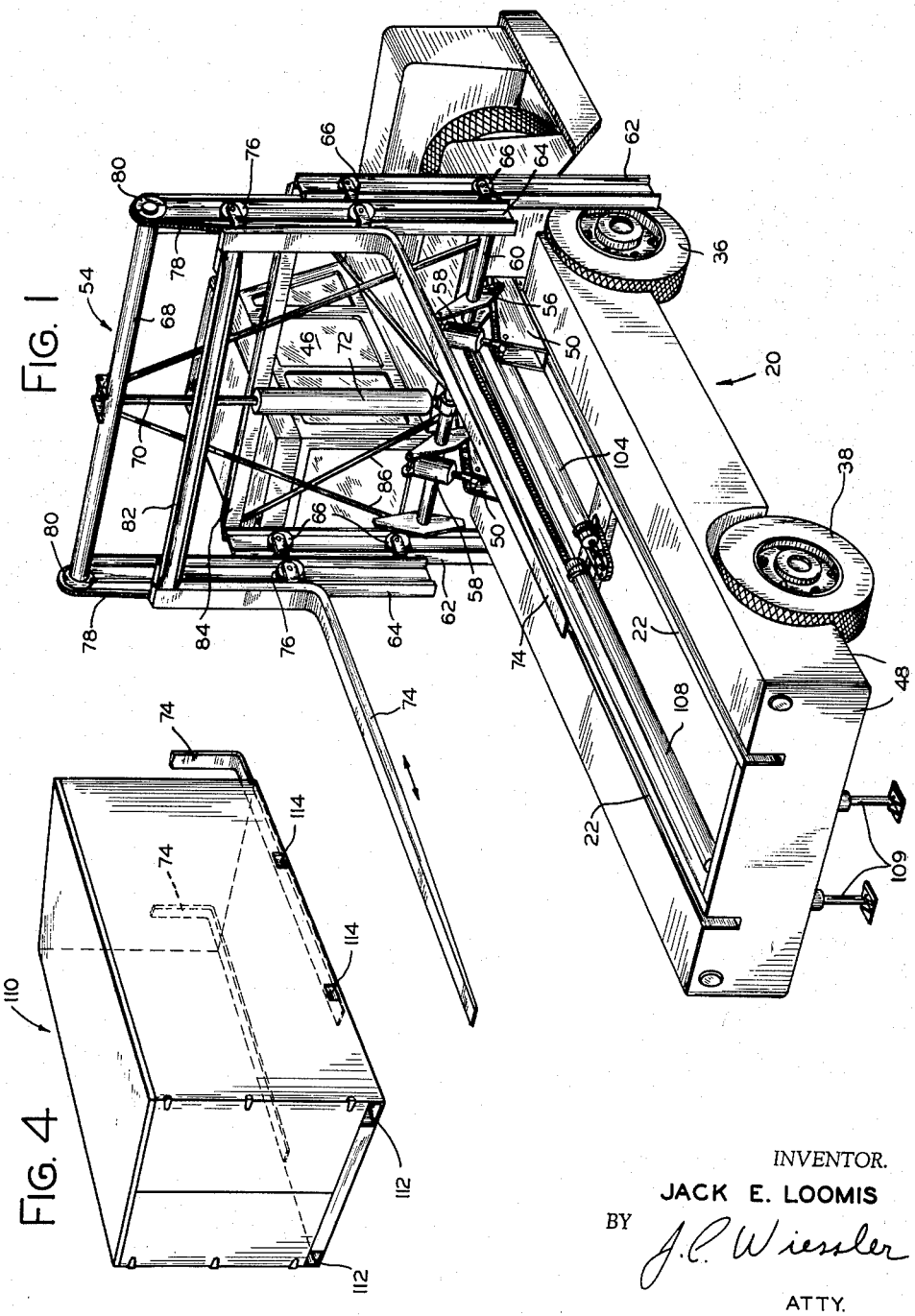
INVENTOR.
JACK E. LOOMIS
BY
J. C. Wiessler
ATTY.

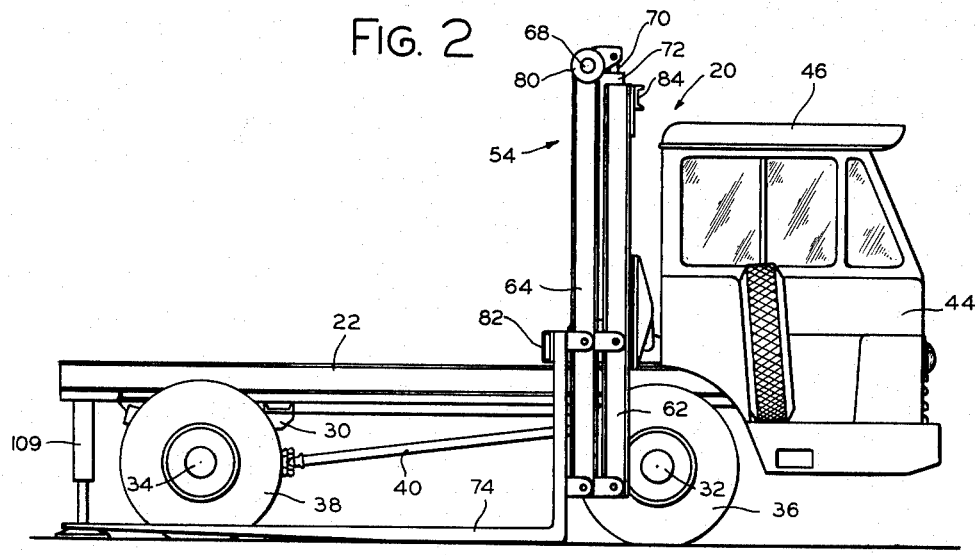
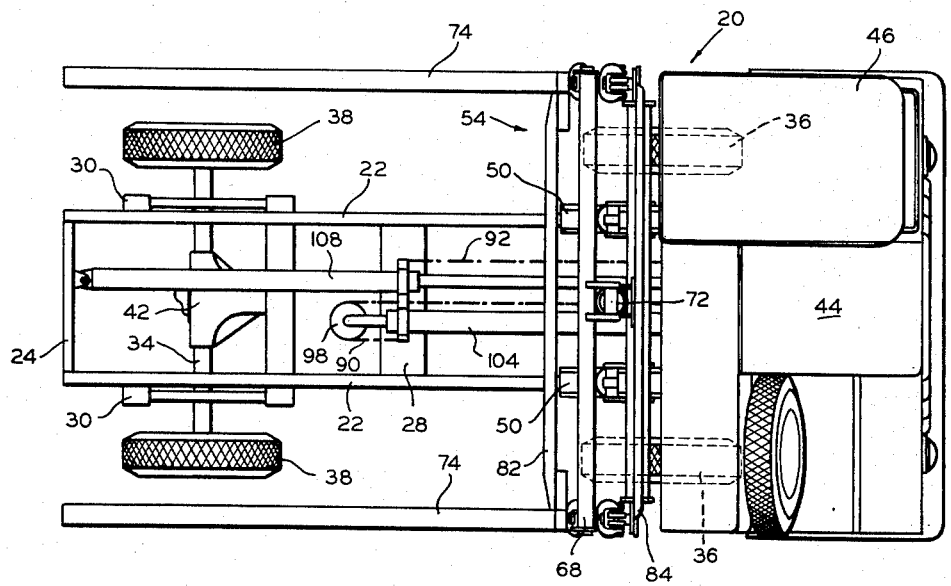
INVENTOR.
JACK E. LOOMIS
BY J. P. Wiessler
ATTY.

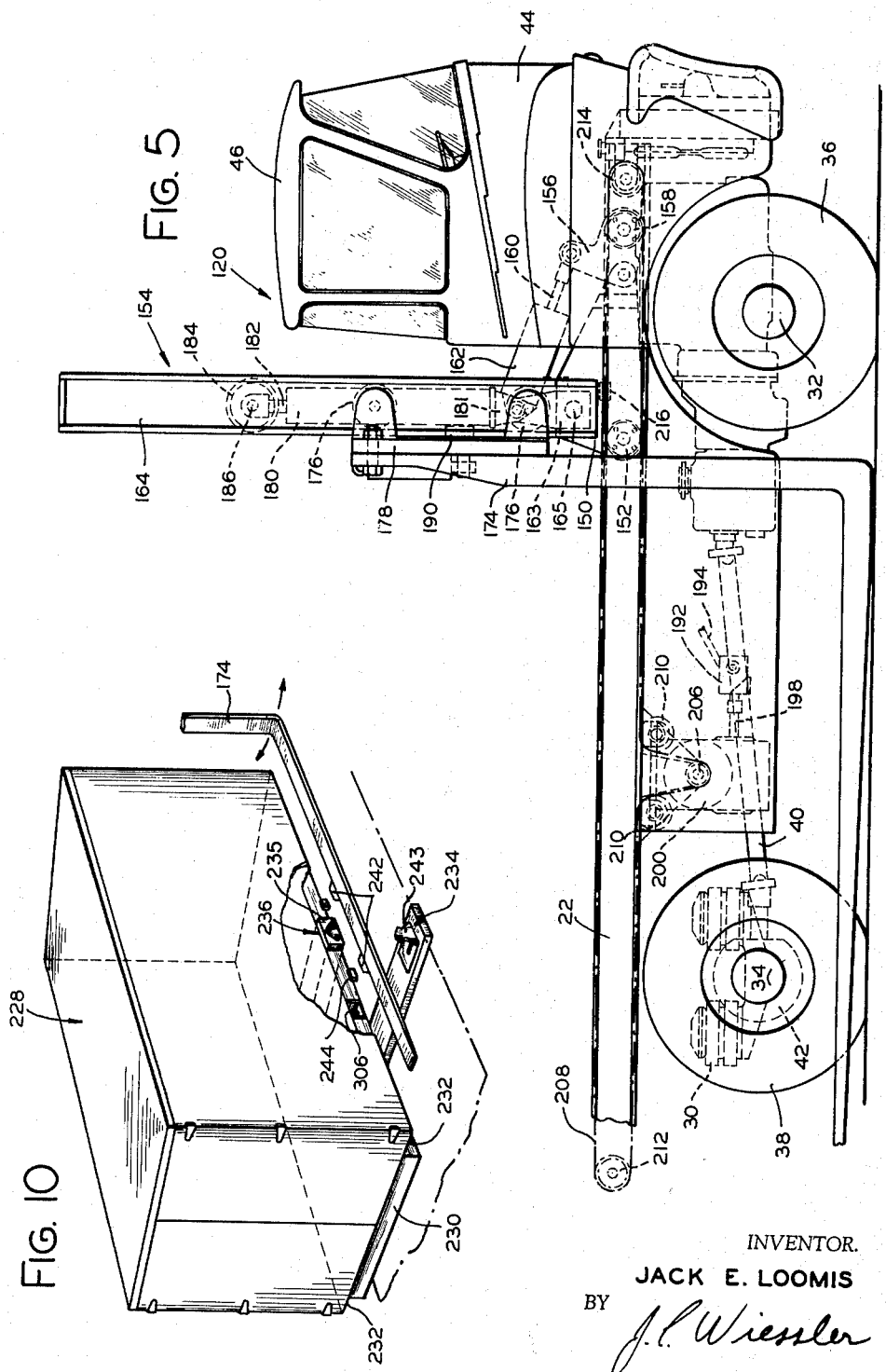

Feb. 15, 1966   J. E. LOOMIS   3,235,105
VEHICLE

Filed July 23, 1958   9 Sheets-Sheet 4

INVENTOR.
JACK E. LOOMIS
BY J. P. Wiessler
ATTY.

Feb. 15, 1966  J. E. LOOMIS  3,235,105
VEHICLE
Filed July 23, 1958  9 Sheets-Sheet 5
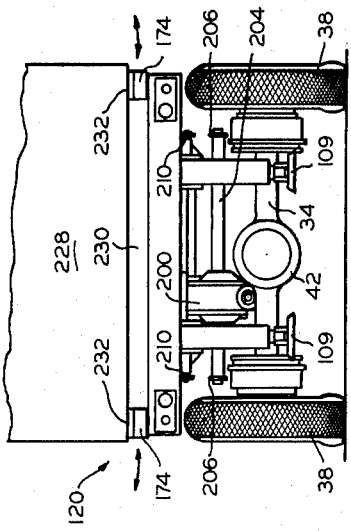
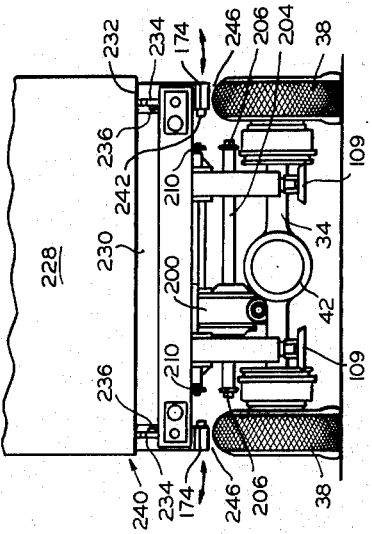
INVENTOR.
JACK E. LOOMIS
BY
*J. P. Wiessler*
ATTY.

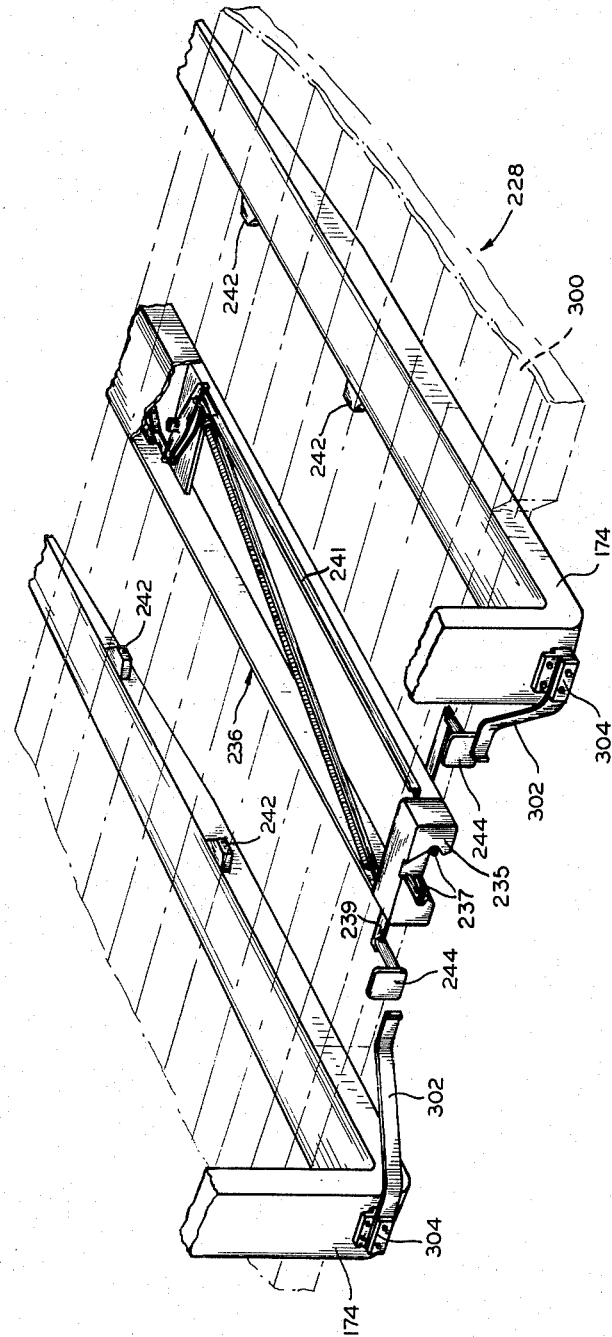

Feb. 15, 1966 J. E. LOOMIS 3,235,105
VEHICLE
Filed July 23, 1958 9 Sheets-Sheet 7
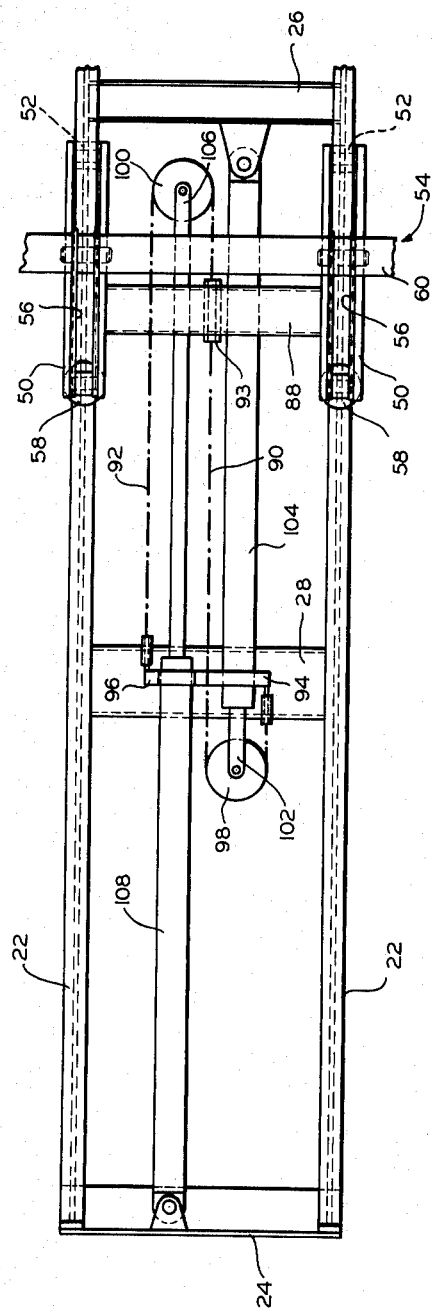
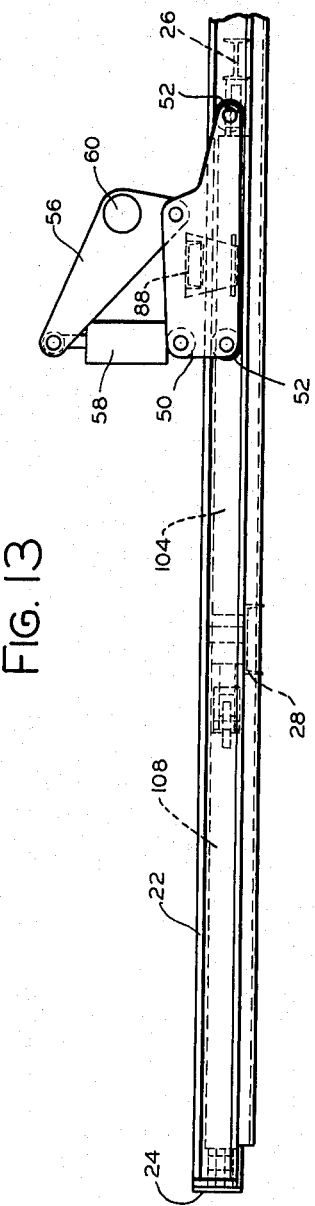
INVENTOR.
JACK E. LOOMIS
BY
ATTY.

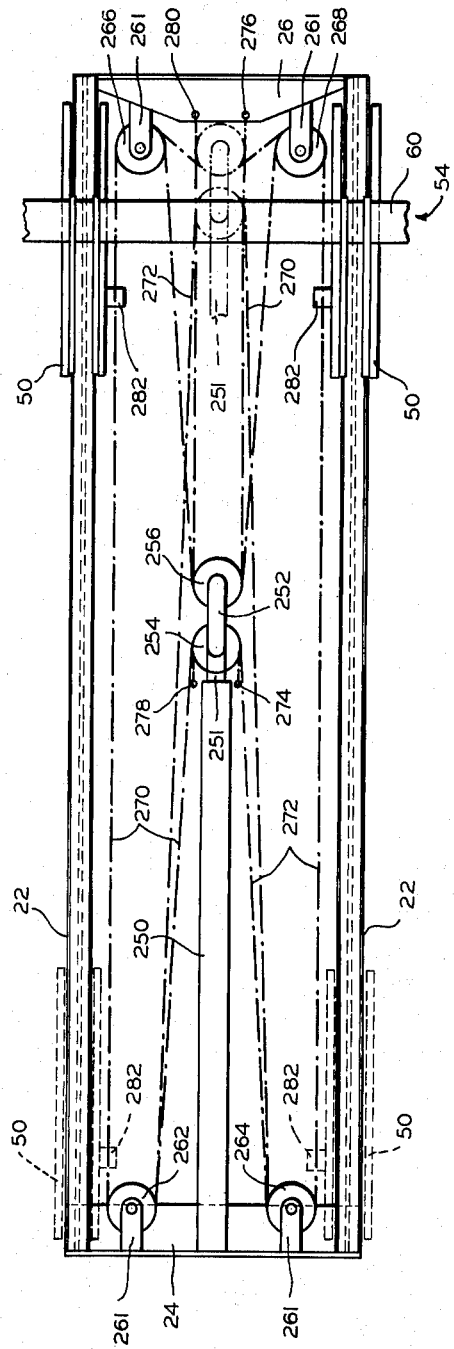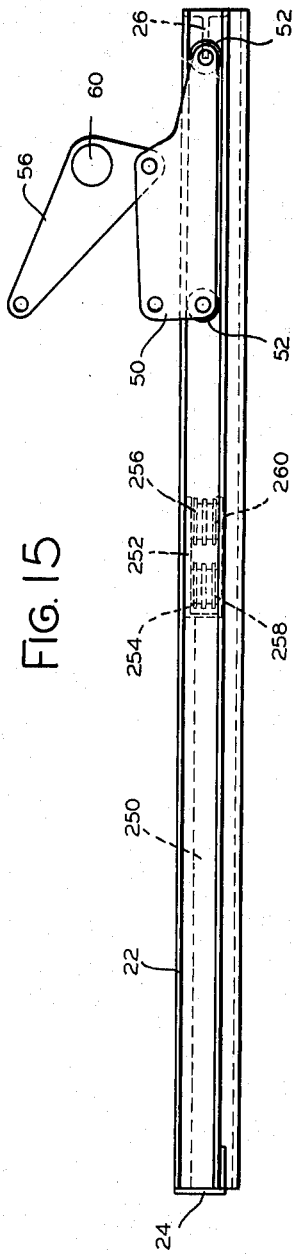

Feb. 15, 1966     J. E. LOOMIS     3,235,105
VEHICLE

Filed July 23, 1958     9 Sheets-Sheet 9

INVENTOR.
JACK E. LOOMIS
BY
ATTY.

United States Patent Office 3,235,105
Patented Feb. 15, 1966

3,235,105
VEHICLE
Jack E. Loomis, Battle Creek, Mich., assignor to Clark Equipment Company, a corporation of Michigan
Filed July 23, 1958, Ser. No. 750,432
10 Claims. (Cl. 214—75)

This invention relates to improvements in vehicles for the handling of freight, including the loading, transporting, and unloading of suitable portable freight carrier structures.

The vehicle of the present invention is useful, for example, as an all purpose vehicle in loading, transporting, and unloading portable freight carrier structures such as disclosed in my co-pending application filed April 9, 1956 under Serial No. 577,118 entitled "Freight Handling Means and Method," now Patent No. 3,014,604 issued December 26, 1961.

The problem of conveniently handling freight for transport without undue handling or loading and unloading from one transporting means to another form of transporting means has long existed in the art and although many have dealt with the problem no prior approaches have gone into commercial use to any substantial extent except for the system disclosed in my aforementioned application and a system in which conventional truck trailers are hauled by railroad flat cars, commonly referred to as the "piggy-back" system.

The piggy-back system, although satisfactory for effecting fast transportation of trailers to eliminate the delay and hazard of highway travel, has many inherent limitations. For example, truck trailers are costly and require substantial capital investment which requires the prompt dispatch of them at the shipping and receiving terminal and negates their use for storage of freight before or after shipping. Also, they present difficulties (due to their height) in satisfactory transporting them on a transporting means, such as a railroad flat car, and additionally require elaborate anchoring mechanisms necessitating tedious and time-consuming manual activity of railroad workers for securing the trailers against rolling movement relative to the flat car or other transporting surface. Further, such known system requires the provision of special loading and unloading docks and the system is primarily suitable only for use at locations having convenient terminal facilities for loading and unloading the truck trailers.

In accordance with the invention of the aforementioned copending application, a freight handling system and method is provided wherein various types of freight carriers are constructed so as to embody in base portions thereof, for example, suitable latching or locking mechanisms adapted to be lockably and unlockably associated with suitable anchoring or retaining means embodied with a carrier supporting surface of the transporting means, such as a railroad flat car, a flat bed truck trailer, a ship or aircraft, etc. The anchoring or retaining means associated with the carrier supporting surface of the transporting means is of a nature which acts as a guide in an operative position for positioning the carrier on the supporting surface and in an inoperative position may be disposed below the level of the carrier supporting surface so that the transporting means may be used in a conventional manner if required.

The aforesaid co-pending application contemplates, for example, that any one of many different types of freight carriers be loaded and unloaded relatively to a freight carrier supporting surface and be transferable from one freight carrier supporting surface to another such surface of any one of the aforementioned exemplary types of transporting means (for subsequent transit to a remote destination) by means of suitable load lifting and transporting mechanism or materials handling equipment, such as conventional fork lift trucks, straddle carriers, overhead cranes, and the like. In order to fully appreciate the nature and versatility of said system, reference should, of course, be made to my aforementioned application.

Following considerable commercial usage experience with the aforesaid system it became apparent that certain improvements might be made therein which would reduce the cost of utilization thereof, while, at the same time, universalizing the uses to which system equipment could be put. It was found, for example, that relatively small volume freight terminal business operations had difficulty in justifying the substantial sums of money required to be expended for such items as large capacity lift trucks in order to realize the greatly increased efficiency of scheduling, handling and dispatching freight inherent in the use of the system. The primary reason for reluctance to adopt the system on the part of many small volume operators, in addition to the normal resistance to change factor, was because expensive materials handling machines, such as fork lift trucks, remained idle for those periods of time between freight loading, unloading and transferring operations, unless other uses for the machines could be found. Large volume freight terminal operations, on the other hand, are able to "work" such machines substantially all of the time.

In addition, since such machines as lift trucks are not normally used as over-the-road vehicles, it was conceived to be desirable to develop a vehicle which was capable of use not only as a lift truck or straddle carrier in the system, for example, but which would also be capable of loading and unloading itself for transporting freight over the road at highway speeds. The concept of such a universally applicable freight handling, transfer and transport truck was therefore developed and comprises, in its different embodiments, the subject matter of this present invention.

Briefly stated, the invention comprises generally an improved self-loading, transporting, and self-unloading vehicle having a load supporting surface and a vertically extending mast structure associated with the supporting structure. The mast structure carries a pair of load engaging means such as lifting fork members and is mounted upon a carriage structure which is adapted and arranged for movement longitudinally of the load supporting surface. In addition, means are provided for raising and lowering the load engaging means upon the mast structure and for pivoting or tilting the mast structure together with the forks.

More specifically, in one embodiment of the invention load engaging forks are arranged so as to be insertable within longitudinal pockets in a freight container for loading and unloading same relative to the load supporting surface of the vehicle and for stabilizing the container upon the vehicle during transit.

In another embodiment of the invention load engaging forks are adapted and arranged for pivotal movement transversely of the vehicle for engagement with longitudinal side recesses in the base of a freight container for loading and unloading same relative to the load supporting surface of the vehicle and for stabilizing same upon the vehicle.

In still other embodiments of the invention, load engaging forks are provided with one or more means for automatically actuating a suitable latching means upon a freight container, which latching means is arranged for cooperation with a suitable anchoring means incorporated in the load supporting surface of the vehicle.

In the various embodiments above mentioned, load engaging forks are adapted and arranged, in their elevating and lowering movements, to straddle the main frame of the vehicle and/or the wheels thereof whereby the vehicle may be maneuvered into loading position and the forks operated to engage a load and elevate same to a position above the load supporting surface, and then move the load into transporting position upon the load supporting surface, all without further maneuvering of the vehicle.

When the load is in transporting position, it may be securely anchored in place either by engagement with the forks or by suitable anchoring means associated with the supporting surface.

In certain of the embodiments hereof the vehicle is capable of operating not only as an improved self-loading and unloading over-the-road transport machine, but also as a transfer vehicle for engaging and transferring freight containers between transporting means, such as railroad flat cars, flat bed truck trailers, ships or aircraft, in the same manner as such containers are engaged and transferred between such transporting means by the use of materials handling machines such as are disclosed in my aforementioned co-pending application.

With the foregoing in mind, it is a primary object of the present invention to provide an improved self-loading and transporting vehicle for handling various kinds of portable freight containers which is capable of moving such containers in both vertical and horizontal directions.

It is another very important object of this invention to provide an improved universal freight handling vehicle which is capable of loading and unloading various kinds of portable freight containers, and transporting the containers at relatively high vehicle speeds and without the necessity of utilizing any other devices or supporting vehicles for carrying out such operations.

Another very important object of this invention is the provision of an improved self-loading, transporting and unloading vehicle which is also capable of functioning as a transfer device for moving freight containers of various kinds from one conventional type of transporting means to another.

A more specific object of the present invention is to provide, in a vehicle of the type contemplated, a pair of load engaging means which are movable both vertically and horizontally outwardly of the opposite sides of the main frame of the vehicle.

It is a still further object of the invention to provide an improved self-loading and transporting vehicle which is capable of engaging a load immediately adjacent to one end of the vehicle with a minimum amount of vehicle maneuvering being required.

Another object of the present invention is to provide a construction whereby the load engaging forks may be positioned within the perimeter of the vehicle in the transporting position, thereby to reduce the overall width of the vehicle when desired for over-the-road hauling.

A further object hereof is to provide means whereby the load engaging means are capable of stabilizing freight containers upon the load supporting surface of the vehicle during over-the-road transit thereof.

A still further object of this invention is to provide means whereby load engaging members may be pivoted in a plane transversely of the vehicle to provide clearance between the members and the main frame of the vehicle during elevating and horizontal movements of such members outwardly of the vehicle's main frame.

It is a feature of the present invention to provide means for tilting load engaging forks thereof.

It is another feature of the present invention to provide in a vehicle of the type contemplated load anchoring means associated with the load supporting surface thereof.

It is a further feature of the invention to provide a plurality of means associated with the load engaging forks of the vehicle for automatically operating a latching means of a freight container whether the vehicle is located at one end of the freight container or at one side thereof.

It is still another feature of the present invention to provide various embodiments of means for actuating the mast structure together with the load engaging members longitudinally of the load supporting surface.

The invention is capable of receiving a variety of mechanical expressions, several of which are illustrated in the accompanying drawings, it being understood that the drawings are for purposes of illustration only. The foregoing and other objects and advantages of this invention will become apparent in view of the following description taken in conjunction with the drawings hereof.

In the drawings:

FIGS. 1 to 3 illustrate one embodiment of a vehicle including one form of loading and unloading mechanism in accordance with the teachings of the present invention, wherein:

FIG. 1 is a rear perspective view of a self-loading, transporting self-unloading vehicle and showing load engaging forks in an elevated position;

FIG. 2 is a side elevation of the vehicle with certain elements omitted for purposes of clarity and showing load engaging forks in a lowered position; and FIG. 3 is a top plan view of the vehicle.

FIG. 4 is a somewhat schematic perspective view of a freight container particularly adapted for use with the vehicle shown in FIGS. 1 to 3.

FIGS. 5 to 8 illustrate another embodiment of such a vehicle including a modified form of loading and unloading mechanism, wherein:

FIG. 5 is a side elevation of the vehicle;

FIG. 6 is a top plan view of the vehicle;

FIG. 7 is a rear elevation of the vehicle; and

FIG. 8 is a partial rear elevational view of the vehicle showing a freight container in transporting position thereon;

FIG. 9 is a view similar to FIG. 8 and illustrates a further modified form of the vehicle shown in FIGS. 5 to 8 with a freight container anchored to the load supporting surface and with load engaging forks in transit position;

FIG. 10 is a somewhat schematic perspective showing of a freight handling container particularly adapted for use with either of the two embodiments of vehicles shown in FIGS. 5 to 9 and including a showing of an optional anchoring and latching mechanism;

FIG. 11 is a somewhat schematic perspective showing of a latching mechanism of a freight container according to the showing of FIG. 10, and wherein load engaging fork members are constructed to automatically operate such a latching device whether located astride the freight container and extending longitudinally thereof or extending through transverse fork pockets of the container;

FIGS. 12 to 15 illustrate two alternative constructions and arrangements for operating the mast to impart the forward and rearward movements thereto, wherein;

FIG. 12 is a top plan view of one form of the mechanism utilizing two opposed hydraulic cylinders;

FIG. 13 is a side elevational view of the mechanism shown in FIG. 12;

FIG. 14 is a top plan view of another form of the mechanism utilizing one double-acting hydraulic cylinder;

FIG. 15 is a side elevational view of the mechanism shown in FIG. 14;

Figure 6:
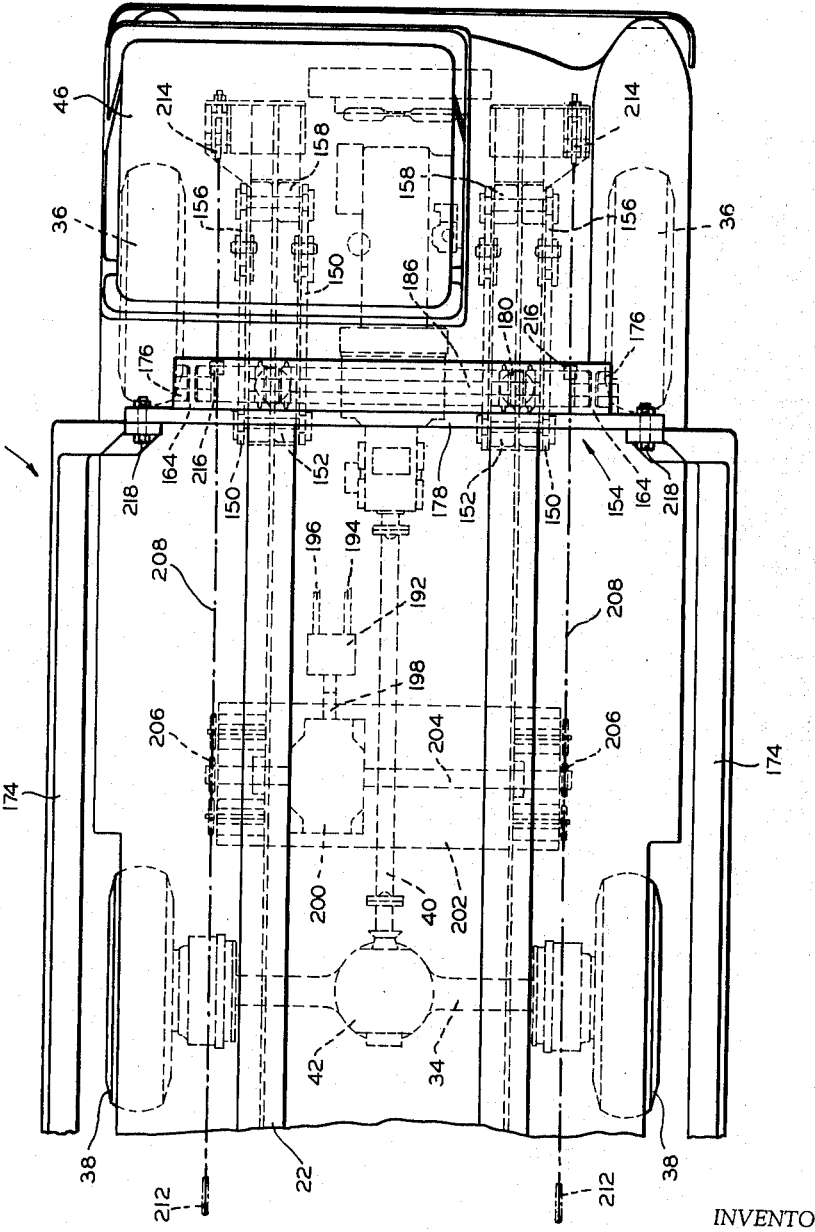

16 showing a side elevation on an enlarged scale of the anchoring and latching mechanism.

Turning now to the particulars of the present invention as found in the accompanying drawings, wherein the same reference numerals are employed to designate corresponding parts in the several figures, and considering initially the embodiment shown in FIGS. 1 to 3 therein, the construction and operation of the vehicle will now be considered in detail.

The vehicle, generally designated by the reference numeral 20, includes a chassis comprising longitudinal stringer elements 22 and transverse frame members such as shown at 24, 26 and 28, all (FIGURES 12 and 13) suitably secured together to form a rigid load supporting structure. The stringer members 22 may be in the form of I-beams as shown herein, or other suitable shapes to accomplish the function performed thereby. Suitably attached to the chassis by means of spring suspending members 30 are front and rear axles 32 and 34, respectively, upon which are journaled front and rear pairs of wheels 36 and 38, respectively. The rear axle 34 is driven by means of a conventional drive shaft 40 and differential 42 from a suitable prime mover (not shown) located at the forward end of the vehicle 20 in a compartment 44 adjacent an operator's cab 46. Within the operator's cab 46 are located suitable controls for the vehicle including a suitable steering wheel for operating the front wheels 36. As shown in FIG. 1, the chassis may, if desired, be enclosed by suitable sheet metal panels 48 to form a body structure presenting a neat appearance. For purposes of clarity in the following description, the panels 48 are not shown in FIGS. 2 and 3.

As may best be observed from inspection of FIGS. 1 and 12–15, a pair of bifurcated shoe elements 50 are mounted upon the stringer elements 22 for sliding movement longitudinally thereof by means of pairs of rollers 52 extending into the channels on opposite sides of the stringers. The shoes 50 are adapted and arranged to support a vertically extending mast structure generally designated at numeral 54 for tilting movement and for movement forwardly and rearwardly relative to the load supporting surface of the vehicle. To that end, a pair of crank arms 56 are secured to each of the shoes 50 for pivotal movement thereon, such pivotal movement being effected by means of hydraulic cylinder and piston means 58 in a well-known manner. Extending through each of the crank arms 56 transversely of the vehicle is a tubular cross-shaft 60 which is secured at each of its ends to a vertically extending I-beam member 62. Actuation of the hydraulic piston means 58 thus imparts a pivotal movement to the mast structure 54 for tilting same for a purpose to be described presently.

The mast structure 54 additionally includes a second pair of I-beam members 64 which are mounted by means of opposed pairs of rollers 66 for vertical sliding movement relative to the I-beam members 62. To that end, a cross-shaft 68 is secured to the upper end of each of the members 64. Midway between its ends, the cross-shaft 68 is suitably connected to a piston rod 70 operable by means of hydraulic cylinder 72 to thus move the members 64 upwardly and downwardly, as desired, relative to the members 62 for a purpose to be described presently. The base end of cylinder 72 is suitably mounted, for example, by means of a journal connection with the cross-shaft 60 forming the pivotal axis for the mast structure which permits the cylinder to tilt with the mast upon energization of cylinders 58.

A pair of load engaging forks 74 are suitably mounted, such as by means of opposed pairs of rollers 76, for vertical sliding movement relative to the members 64. To that end, each of a pair of chains 78 has one end thereof secured to the upper end of each of the forks 74 and is trained over a sprocket 80 suitably journaled on the cross-shaft 68. The opposite end of each chain 78 is suitably secured to the upper end of the vertically stationary I-beam member 62. Suitable additional sprocket means (not shown) may, if desired, be secured to the members 62 and the chain 78 trained over same such that actuation of the hydraulic cylinder 72 will impart a ratio of movement of the forks 74 relative to the members 64 equal to the ratio between the sprocket 80 and the additional sprocket means in a manner well-known in the lift truck art.

Suitable transverse frame members, such as designated by numerals 82 and 84, as well as diagonal tie-rods 86, may be provided to strengthen the various elements of the mast 54 to provide a rigid load-supporting structure.

As previously mentioned, the mast structure 54 is adapted and arranged for sliding movement forwardly and rearwardly of the vehicle 20 along the stringer elements 22. To that end, the shoe elements 50 are joined together by means of a transverse member 88 (see FIG. 12). One end of each of a pair of link chains 90 and 92 is suitably secured by means of an anchoring member 93 at opposite sides of the member 88. The opposite ends of each of the chains 90 and 92 are suitably secured to anchoring members 94 and 96, respectively. Intermediate their ends, the chains 90 and 92 are trained over sprockets 98 and 100, respectively. The sprocket 98 is rotatably mounted upon the piston rod 102 of a hydraulic actuating cylinder 104, and the sprocket 100 is rotatably mounted upon the piston rod 106 of a hydraulic actuating cylinder 108. The hydraulic cylinder 104 is suitably secured at its opposite ends to the transverse frame members 26 and 28 of the vehicle chassis, and the hydraulic cylinder 108 is suitably secured at its opposite ends to the transverse frame members 24 and 26.

As may be observed in FIG. 12, the shoe elements 50 are in their extreme forward position relative to the stringers 22. In this position, the piston rod 106 is fully extended relative to the cylinder 108 and the piston rod 102 is fully retracted relative to the cylinder 104. Should it be desired to move the mast structure 54 rearwardly along the stringers 22, the operator of the vehicle can, by manipulation of suitable control elements within the operator's cab 46, cause hydraulic fluid to be admitted to the right-hand end of cylinder 104 and to be bled from the left-hand end of the cylinder 108. The resultant movement of the piston rods 102 and 106, and thus the sprockets 98 and 100, will cause the transverse member 88, and thus the shoes 50 and the mast structure 54, to be moved rearwardly any desired distance along the load supporting surface.

With the structure as above described, the load-engaging forks 74 may be moved vertically up and down by energization of the hydraulic cylinder 72, pivotally about an axis transverse of the vehicle by energization of the hydraulic cylinder 58, and/or forwardly or rearwardly by energization of the cylinders 104 and 108.

It is important to note at this time that the load-engaging fork members 74 are movable upwardly and downwardly between the positions of FIGS. 1 and 2 transversely outwardly of the main body of the vehicle so as to enable the vehicle to be moved into position to engage a load immediately adjacent the rear of the vehicle with a minimum amount of maneuvering being required, as will be discussed further hereinbelow.

The vehicle 20 may, if desired, be provided with a pair of spaced stabilizing jacks 109 of well-known type for aiding in stabilizing the vehicle during loading and unloading operations. The jacks 109 may, for example, be hydraulic cylinder and piston assemblies and may be selectively operated by means of suitable control elements located within the operator's cab 46.

Referring now to FIG. 4, there is shown a freight container 110 which is particularly adapted for cooperation with the vehicle 20 above described. The freight container 110 comprises an enclosed container arranged for engagement by the load engaging forks 74 for loading, unloading and transporting by the vehicle 20. The container 110 may be constructed in a manner similar to that described in my previously identified co-pending application, but modified, for instance, to provide a pair of longitudinally extending fork receiving pockets 112 in the base thereof for receiving the forks 74 of the vehicle 20 described herein and to eliminate container latching mechanism such as described generally hereinafter. The container 110 may be provided with transversely extending fork pockets 114 for side loading from one conveyance to another, either by vehicle 20 or by another type of materials handling machine such as is described in said co-pending application.

Having now described the essential elements of the vehicle 20 and one form of container suitable for cooperation therewith, it is believed that the invention will be best understood by describing a typical operation of the vehicle in loading, transporting and unloading such a container.

In order to engage a load, such as the container 110, the vehicle 20 is maneuvered into position with the rear thereof in close proximity to the load. The load engaging forks 74 are then raised or lowered by energization of the cylinder 72, depending upon the particular elevation of the freight container, until the forks are in alignment with the fork receiving pockets 112. The operator of the vehicle then manipulates a control within the cab 46 to cause hydraulic fluid to be admitted into the right-hand end of cylinder 104 and fluid to be bled from the left-hand end of cylinder 108 (as viewed in FIG. 12), thereby causing the mast structure 54 and thus the forks 74 to be moved rearwardly with the forks 74 entering the fork receiving pockets 112 as shown in FIG. 4. When the forks 74 are extended fully into the fork receiving pockets of the container, they are then elevated under the control of the operator by energization of the cylinder 72 to lift the container 110 from its supporting surface.

If the container 110 has been supported at a low level such as upon the ground, the forks 74 are elevated until the base of the container is above the top of the rear body portion of the vehicle as defined by the top of the stringer elements 22. The operator of the vehicle then manipulates suitable control elements to cause hydraulic fluid under pressure to be admitted to the left-hand end of cylinder 108 and bled from the right-hand end of cylinder 104. The mast structure 54 and thus the forks 74 with the container 110 engaged thereon is thereby caused to be moved over the rear body portion or load supporting surface of the vehicle. The stabilizing jacks 109 aid in preventing the loaded container from tipping the vehicle about the rear axle when the extended forks 74 lift the container. The mast structure 54, and thus the forks 74, may also be tilted by cylinders 58 about an axis transverse of the vehicle to prevent the loaded container from slipping off of the forks during the loading operation.

When the forks have been fully retracted with the container over the load supporting surface of the vehicle, they are then lowered by actuation of the cylinder 72 until the container 110 rests upon the load supporting surface. The vehicle 20 may then be driven to any desired location to transport the loaded container.

In order to prevent the loaded container 110 from sliding longitudinally of the vehicle relative to the forks 74 during transport, especially over long distances or rough terrain, hydraulic pressure in the cylinder 72 may be maintained to continually urge the forks 74 downwardly, thereby forcibly urging the base of the container 110 into contact with the load supporting surface at all times during transit.

In order to unload the container from the vehicle at destination, the actions described above for loading same are merely reversed.

The vehicle 20 is then in condition to rapidly pick up another load for transit to another destination and no time is lost in waiting for the vehicle to be unloaded as is the case with conventional trucking operations.

From the above described mode of operation it will now be readily apparent that a minimum amount of maneuvering of the vehicle 20 is required during self-loading and self-unloading operations. This desirable result is attributable in large part to the fact that the fork 74 is mounted upon mast structure 54 to move both vertically and longitudinally of the vehicle transversely outwardly thereof, as pointed out hereinabove. As a result of this construction, the vehicle 20 can, of course, be maneuvered into a position wherein the rear of the vehicle is immediately adjacent the one end of container 110, in which position the forks can be moved into registry with the pockets 112. In prior known mechanisms load engaging means have not been so movable outside vehicle chassis thereby requiring that such load engaging means be first moved longitudinally beyond the end of the chassis before being actuatable downwardly into adjacency with the vehicle supporting surface. Such an arrangement would, of course, require that the maneuvering of the vehicle into a load engaging position be accomplished after the load engaging means have been moved to extend beyond the rear of the vehicle. The disadvantages of such a vehicle are apparent.

Referring now to FIGS. 5–8, a modified embodiment of the vehicle described above is illustrated. Many of the basic components of this vehicle, generally designated by the reference numeral 120, are substantially identical to corresponding components of the vehicle 20 and have therefore been designated by the same reference numerals. The vehicle 120 differs in the main from the vehicle 20 in that the structure of the mast, forks, and the operating mechanism therefor are substantially different.

In the vehicle 120, a pair of bifurcated shoe elements 150 are mounted upon the stringer elements 22 for movement longitudinally thereof upon pairs of rollers 152 which extend into the channels on opposite sides of the stringers. The shoes 150 are adapted and arranged to support a vertically extending mast structure 154 for movement forwardly and rearwardly, as well as for pivotal movement relative to the load supporting surface of the vehicle. To that end a pair of bifurcated elements 156 are secured to the forward end of the shoe elements 150 and are also adapted for movement along stringers 22 upon pairs of rollers 153. Piston rods 160 of a pair of hydraulic cylinders 162 are secured to the elements 156, and the cylinders 162 are secured by means of brackets 163 to the mast structure 154 to effect pivotal movement thereof about a transverse pivot shaft 165 which is secured at its ends to vertically extending I-beam members 164 of the mast and to which brackets 163 are secured.

A pair of load engaging forks 174 are mounted for vertical sliding movement relative to the members 164, by means of pairs of rollers 176, which are mounted upon a transverse plate 178 for engaging the channels of the members 164. To effect vertical movement of the forks 174, a pair of hydraulic actuating cylinders 180 are rigidly secured at their lower ends to brackets 163 by means of bracket supports 181 and the piston rods 182 thereof carry pairs of sprockets 184 which are journaled for rotation upon a cross-shaft 186. The cross-shaft 186 serves to synchronize vertical movements of the piston rods in known manner. Each of the sprockets 184 has a chain 188 trained thereover, one free end of each being secured to the transverse plate 178 by means of an anchor block 190 and the opposite free ends of the chains being suitably secured to the forward sides of the cylinders 180. The above described arrangement is such that energizing the hydraulic cylinders 180 to extend the piston rods 182 will impart a vertical lifting movement to the load engaging forks 174.

As previously mentioned, the mast structure 154 is adapted and arranged for sliding movement forwardly and rearwardly of the vehicle 120 along the stringer elements 22. To that end, a suitable hydraulic drive means is provided. Referring to FIGS. 5 and 6 there is shown a rotary hydraulic drive motor 192 of the reversible type which may be connected to a suitable pump and controls (not shown) by means of conduits 194 and 196. The hydraulic drive motor 192 is adapted and arranged to drive the input shaft 198 of a suitable gearing arrangement within a housing 200 which is secured to a transverse frame member 202 extending across and secured to the stringer elements 22. The output shaft 204 of the gearing arrangement is adapted to drive a pair of sprockets 206 suitably secured to each end thereof. Link chains 208 are trained over the sprockets 206 and are directed by means of idler sprockets 210 to extend longitudinally toward each end of the stringer elements 22 where they are trained over sprockets 212 and 214 which are suitably journaled upon the stringer elements 22, for example, by means of stub shafts or the like. The chains 208 are secured at one point along their length by means of anchor blocks 216 to the bottom of the vertical I-beam members 164 of the mast structure 154. As above mentioned, the hydraulic drive motor 192 is of the reversible type and rotation thereof in one direction will result in a driving of the chains 208 to cause the mast structure 154 and thus the load engaging forks 174 to be moved longitudinally forwardly relative to the vehicle, and rotation thereof in the opposite direction will result in a movement of the mast structure rearwardly relative to the vehicle.

In the present embodiment, the load engaging forks 174 are adapted and arranged for pivotal movement in a plane transverse of the vehicle. To that end, the vertically extending arms of each of the forks are pivotally connected as at numeral 218 to the transverse plate 178 and are provided with a generally perpendicularly projecting lever arm 220 (see FIG. 7). The arms 220 are pivotally connected by means of links 222 to the piston rod 224 of a hydraulic cylinder 226 which is secured to the transverse plate 178. Energization of the cylinder 226 is thus adapted and arranged to impart a pivotal movement to the forks 174 about their pivotal connections 218 with the transverse plate 178. Suitable guide elements 223 are secured to the transverse plate 178 to guide the lever arms 220 in their pivotal movement, and a guide element 225 is provided on the transverse plate to guide the piston rod 224 in its vertical movement relative thereto.

With the modified vehicle 120 as above described, the load engaging forks 174 may be moved vertically up and down by energization of the hydraulic cylinders 180, pivotally about an axis transverse of the vehicle by energization of the hydraulic cylinders 162, forwardly or rearwardly of the vehicle by energization of the rotary hydraulic motor 192, and pivotally in a plane transverse of the vehicle by energization of the cylinder 226.

Referring now to FIG. 10, there is shown a freight handling container 228 which is particularly adapted for cooperation with the modified vehicle 120 above described. The freight handling container 228 is similar in construction to the one described in connection with FIG. 4 and comprises an enclosed container arranged for engagement by the load engaging forks 174 for loading and unloading and for transfer by the vehicle 120. This container may likewise be constructed in a manner such as described in my previously mentioned co-pending application. The container 228 is provided with a base portion 230 which is narrower transversely than the main body of the container. This arrangement provides a pair of projecting ledges 232 under which the load engaging forks may be received for engaging the container. FIG. 10 also includes a showing of an anchoring device 234 and a latching mechanism 236 which need not necessarily be provided for use in connection with the modified vehicle 120, and the function and operation thereof will be described presently in connection with a further modified form of the vehicle.

Having now described the essential elements of the modified vehicle 120 and one form of container 228 suitable for cooperation therewith, it is believed that the invention will be best understood by describing a typical operation of the vehicle in loading, transporting and unloading such a container.

In order to engage a load, such as the container 228, the vehicle 120 is maneuvered into position with the rear thereof in close proximity to the load. The load engaging forks 174 are then raised or lowered, as necessary, by energization of the cylinders 180 depending upon the particular elevation of the freight container, until the forks 174 are in alignment beneath the projecting ledges 232. At this time it should be noted that if the container is supported at an elevation which is lower than the top of the stringer members 22 it is necessary that the forks 174 be positioned transversely outwardly sufficiently to clear the vehicle in their downward movement. The operator of the vehicle then manipulates a control within the cab 46 to cause hydraulic fluid under pressure to be admitted into the rotary hydraulic motor 192 to thereby cause the mast structure 154, and thus the forks 174, to be moved rearwardly with the forks on an elevation lower than the projecting ledges 232. When the forks 174 are fully extended along the sides of the container 228, they are then pivoted inwardly toward the container by energization of the cylinder 226. The forks are then elevated under the control of the operator by energization of cylinders 180 to lift the container 228 from its supporting surface.

If the container 228 has been supported at a low level, such as upon the ground, the forks 174, are elevated until the base of the container is above the top of the rear body portion of the vehicle as defined by the top of the stringer members 22. The operator then manipulates suitable control means to cause the rotary hydraulic motor 192 to be reversed to thereby cause the mast structure 154, and thus the forks 174 with the container 228 engaged thereon, to be moved over the rear body portion or load supporting surface of the vehicle. Stabilizing jacks 109 aid in preventing the loaded container from tipping the vehicle about the rear axle when the extended forks 174 lift the container. As in the previously described embodiment, the mast structure 154 and thus the forks 174 may be tilted by cylinders 162 about an axis transverse of the vehicle to prevent the loaded container from slipping off of the forks during the loading operation. When the forks have been fully retracted with the container over the load supporting surface of the vehicle, they are then lowered by energization of the cylinders 180 until the container 228 rests upon the load supporting surface. The vehicle 120 may be then be driven to any desired location to transport the loaded container.

In order to stabilize the container 228 upon the vehicle 120 during transport, especially over long distances or over rough terrain, hydraulic pressure in the cylinder 226 may be maintained to continually urge the forks 174 transversely inward against the base portion 230 of the container at all times during transit.

In order to unload the container from the vehicle at destination, the actions described above for loading same are merely reversed.

Referring now to FIG. 9, there is shown a further modified form of vehicle 240 which is substantially the same in all respects as the form shown and described in connection with FIGS. 5 to 8.

Figure 16:
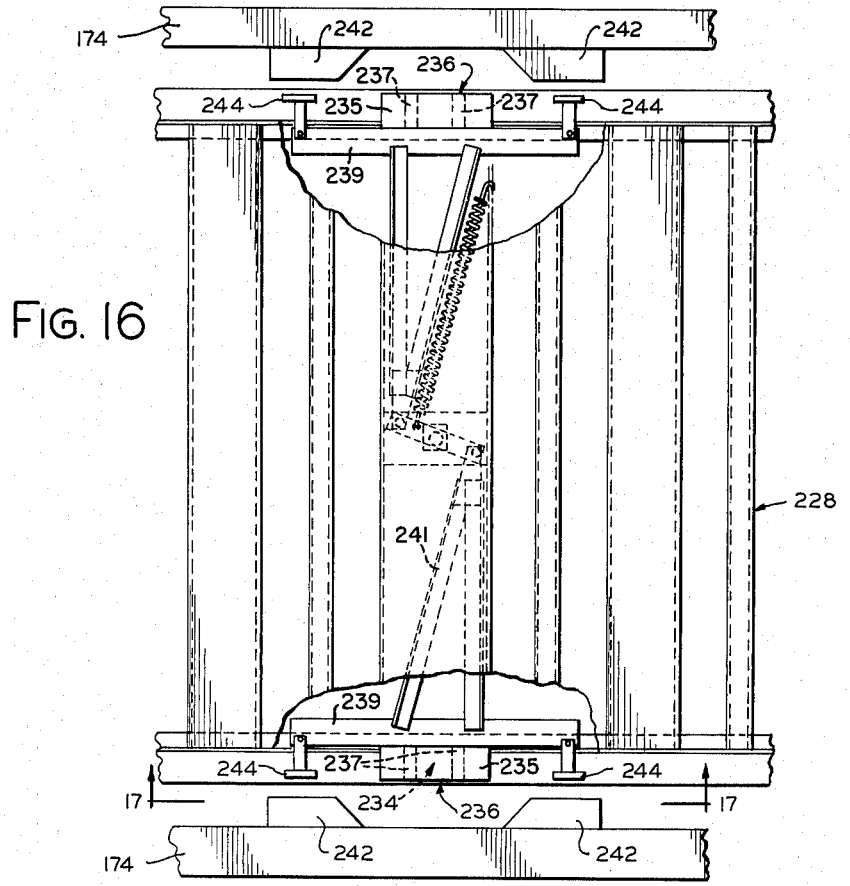
FIG. 16 is a plan view in cross section showing the base portion of a container such as shown in FIG. 10 and illustrates in more detail the arrangement of the locking means, anchoring means, and cooperating portions of the load engaging members.
Figure 17:
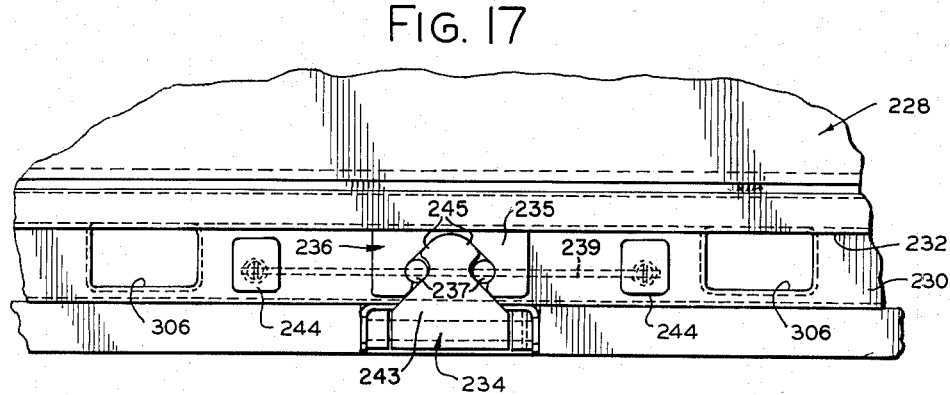
FIG. 17 is a view taken substantially along the line 17—17 of FIG.

The vehicle 240 is particularly adaptable for use with portable freight containers of a type having an automatic latching mechanism in the base portion thereof which cooperates with an anchoring device such as disclosed in my previously mentioned co-pending application. Such latching mechanism and anchoring device are shown in FIGS. 10, 16 and 17. The latching mechanism 236 includes a pair of latching blocks 235 secured respectively to opposite sides of the container. Slidably disposed within each latch block 235 is a pair of locking pins 237. The locking pins 237 and actuating pads 244 on one side of the container are connected together by means of a cross bar 239. Another cross bar 239 similarly connects locking pins 237 and actuating pads 244 on the opposite side of the container. The locking pins 237 on one side of the container are connected to the locking pins 237 on the other side of the container by means of a linkage mechanism 241 so that movement of the locking pins on one side of the container results in a similar movement of the locking pins 237 on the other side of the container. The anchoring device 234 includes a generally triangular member 243 having projecting ear portions 245 adjacent its upper end and forming thereby suitable recesses beneath the ear portions 245 for receiving the locking pins 237.

For a more detailed description of the structure and operation of these devices, reference may be had to my prior application describing and claiming same. For the present description it is deemed sufficient to point out that the latching mechanism 236 may be automatically actuated for reception by the anchoring device 234 when the forks 174 engage the container 228, such actuation being effected by means of projecting lugs 242 on the forks 174 which engage latch actuating pads 244 on the container 228. When the container 228 is positioned on the vehicle 240 with the latching mechanism 236 in cooperation with the anchoring device 234, and the forks 174 are subsequently pivoted outwardly away from the container 228, the latching mechanism 236 is automatically actuated to engage the anchoring device 234 to lock the container to the vehicle. Since the latching function cannot be accomplished without the outward pivoting of the forks 174, it then becomes desirable to provide some convenient location for storing the forks 174 during transport of the container 228 over highways inasmuch as they would otherwise project outwardly from the vehicle. Such outward projection in most instances might exceed the maximum width allowed for over-the-road vehicles in most states. To that end, a clearance space 246 is provided vertically between the rear wheels 38 of the vehicle and the rear frame members thereof wherein the forks 174 may be received by lowering same and pivoting them inwardly as shown in FIG. 9. The forward end of the load supporting surface of the vehicle 240 may also be provided with suitable notches for reception of the vertically extending arms of the forks 174 when moved to the transporting position. The arrangement as above described allows for a reduction in the over-all width of the vehicle when desired for over-the-road hauling.

Referring now to FIG. 11, a further modification of the invention is there shown which will now be described. In this embodiment, the load engaging forks are modified so as to provide a transporting vehicle which is adaptable for self-loading and self-unloading as described above in connection with FIG. 9, and in addition, may also be used as a transfer vehicle for engaging and transferring freight containers between transporting means, such as railroad flat cars, flat bed truck trailers, ships or aircraft, in the same manner as such containers are engaged and transferred between such transporting means by the use of materials handling machines such as are disclosed in my aforementioned co-pending application. A latching means 236 (of the type generally shown in FIG. 10) is located substantially centrally of the base structure for a freight carrier means such as the container 228, for example, hereinabove described; it being understood, of course, that such latching means 236 is located beneath the decking members 300 which define the supporting surface or bottom wall of such freight carrier means. The load engaging forks 174 of the embodiment described in FIG. 9 above are further modified to include a pair of cantilever leaf spring members 302 attached to the upright leg members thereof by means of block assemblies 304. The outer or free ends of the cantilever spring members 302 are adapted and arranged to engage the latch actuating pads 244 when the forks 174 are inserted within transverse fork receiving pockets 306 (see FIG. 10) in the freight container 228.

With the above described arrangement of the load engaging forks 174, they are thus adapted to automatically operate a latching device such as 236, whether located astride the freight container 228 and extending longitudinally thereof, in which case the projecting lugs 242 will be effective, or extending through transverse fork pockets of the container, in which case the cantilever spring members 302 will be effective.

When operating the vehicle in connection with freight containers including latching means, with the forks 174 modified as above described, the vehicle may be utilized for self-loading, transporting, and self-unloading by engaging the container longitudinally thereof, or may be utilized as a transfer vehicle for engaging the freight containers transversely thereof for transferring them between various other types of freight handling means, such as railroad flat cars, flat bed truck trailers, ships or aircraft. Thus, such modified vehicle is universally adaptable for a plurality of uses, and therefore provides a vehicle which is extremely versatile, especially for relatively small volume freight terminal business operations wherein the vehicle can be made to "work" substantially all of the time.

Referring now to FIGS. 14 and 15, there is shown a further modified form of mechanism for effecting the the forward and rearward movement of the mast structure for a vehicle of the type disclosed herein. At this point it should be noted that the mechanism of FIGS. 14 and 15 may be used with equal facility in either of the various embodiments of vehicles described above. Furthermore, the mechanisms described for moving the mast structure in connection with the various modifications of vehicles are equally interchangeable one with the other.

The mechanism shown in FIGS. 14 and 15 is similar to that described in connection with the vehicle of FIGS. 1 to 3, except that one double-acting hydraulic cylinder 250 is arranged to cause the mast structure 54 to move forwardly and rearwardly along the stringer members 22 in place of the two cylinders of the earlier described structure.

The hydraulic cylinder 250 is secured at its left-hand end to the transverse frame member 24 of the chassis. The piston rod 251 of cylinder 250 has secured thereto a block 252 carrying four sprockets 254, 256, 258 and 260 (FIG. 15). Each of the transverse frame members 24 and 26 has rotatably secured thereto by means of brackets 261 a pair of sprockets as indicated at 262, 264, 266 and 268. A pair of chains 270 and 272 are utilized to multiply the movement of the piston rod 252 to impart movement to the shoe elements 50 of the mast structure 54. To that end, the chain 270 is suitably anchored at one end, for example, to the cylinder 250 as at numeral 274. The chain 270 is then trained in order over the sprockets 254, 262, 266 and 256, and has its opposite end suitably anchored as at numeral 276 to the transverse frame member 26. The chain 272 is likewise anchored at both ends thereof as at numerals 278 and 280 and is trained over the sprockets 258, 264, 268 and 260. At a point between their ends, the chains 270 and 272 are suitably attached as by anchor blocks 282 to the shoe elements 50.

The above described arrangement is such that movement of the piston rod 251 throughout a given distance will result in a movement of the shoe elements 50 throughout a distance equal to twice such given distance.

The position of the movable sprockets and the shoe elements is shown in solid lines corresponding to the extreme forward position of the mast structure 54, and the position thereof corresponding to the extreme rearward position of the mast structure is indicated by dotted lines in FIG. 14.

While various illustrative embodiments of the vehicle of the present invention have been herein illustrated and described, many other alterations and modifications thereof will present themselves to persons skilled in the art. It is contemplated that the various means for causing the forward and rearward movement of the mast structure, the vertical upward and downward movement of the load engaging forks, the pivotal movement of the mast structure and the pivotal movements of the forks, may be used with equal facility in any combination with one another without substantial modification and without departing from the spirit of the invention.

While the anchoring device and latching means of my co-pending application have been shown and described only in connection with the embodiments wherein the load engaging forks are arranged for pivotal movement about an axis extending longitudinally of the vehicle as shown in FIGS. 9 and 10, or in connection with a transfer vehicle equipped with the modified load engaging forks as shown in FIG. 11, it is further contemplated that such means can be incorporated in the embodiments of vehicle shown in FIGS. 1 to 3 or FIGS. 5 to 8 by a simple modification wherein the latch operating pads 224 (FIG. 10) would be movable to operate the latching device upon vertical movement of the forks. For example, the projecting lugs 242 could be formed with a cam surface which would engage the latch operating pads 244 to urge them inwardly upon vertical movement of the forks 174. It is further contemplated that the latch operating pads 244 could be directed downwardly for engagement by the projecting lugs 242, and, by means of any well-known mechanical linkage, could translate the vertical movement of the forks 174 into a transverse operation of the latching means 236.

From the foregoing description it should now be apparent that the present invention provides a new and novel vehicle for accomplishing the stated objects, which vehicle is capable of handling portable freight containers or the like and is self-loading and self-unloading and is adapted and arranged to be used as a transfer vehicle as well as for over-the-road hauling. The vehicle may pick up a load from ground level or from a loading dock, aircraft, ship or the like, deposit it upon the load supporting surface and retain same in a stable manner thereon for transport, and then unload itself by depositing the load in any desired location.

I claim:

1. A transporting vehicle of the character described comprising in combination, a chassis, a vertically extending mast structure mounted for movement on said chassis, means for moving said mast structure longitudinally relative to said chassis, means for pivoting said mast structure about an axis extending transversely of said chassis, load engaging means mounted for movement on said mast structure, means for moving said load engaging means vertically relative to said mast structure so as to straddle said chassis, and means for pivoting said load engaging means about an axis extending longitudinally of said chassis.

2. A transporting vehicle of the character described comprising in combination, a chassis defining a load supporting surface including a pair of longitudinal frame members, a pair of shoe elements movably mounted upon said frame members, means for moving said shoe elements relative to said frame members, a mast structure including a pair of upright frame members pivotally secured to said shoe elements, means for pivoting said mast structure relative to said shoe elements about an axis extending transversely of said vehicle, a pair of load engaging forks movably mounted upon said upright frame members, means for moving said forks vertically relative to said upright frame members, said forks being mounted for pivotal movement about axes extending parallel to said longitudinal frame members, and means for pivoting said forks about said axes.

3. A transporting vehicle of the character described comprising in combination, a chassis defining a load supporting surface, a pair of load engaging forks mounted upon said chassis for movement relative thereto, means for moving said forks forwardly and rearwardly relative to said chassis, means for moving said forks vertically upwardly and downwardly relative to said chassis, means having axes extending longitudinally of said vehicle for pivotally supporting said forks, and means for pivoting said forks about said axes, said load engaging forks being actuated by said latter means to non-straddling relation to said chassis upon vertical movement thereof above said load supporting surface and being actuated by said latter means to straddling relation to said chassis upon vertical movement thereof below said load supporting surface.

4. A transporting vehicle of the character described comprising in combination, a chassis defining a load supporting surface, a pair of load engaging forks mounted upon said chassis for movement relative thereto, means for moving said forks longitudinally relative to said chassis, means for moving said forks vertically relative to said chassis, said load engaging forks being actuatable to straddle said chassis upon vertical and longitudinal movements thereof below said load supporting surface and being actuatable to a non-straddling relation to said chassis upon vertical and longitudinal movement thereof above said load supporting surface, means having axes extending longitudinally and transversely of said chassis for supporting said forks, and means for pivoting said forks about both said axes.

5. A transporting vehicle of the character described comprising in combination, a chassis defining a longitudinal load supporting surface, a vertical mast structure mounted transversely inwardly of the sides of said surface for movement longitudinally thereof, a pair of load engaging forks mounted upon said mast structure for movement therewith and vertically thereof, means for moving said mast structure and forks forwardly and rearwardly relative to said chassis, means for moving said forks vertically upwardly and downwardly in said mast structure, means having axes extending longitudinally of said chassis for pivotally supporting said forks, and means for pivoting said forks towards and away from one another about said axes, said load engaging forks being actuatable to straddle said chassis upon vertical movement thereof below said load supporting surface and being actuatable to non-straddling relation to said chassis upon vertical movement thereof above said load supporting surface.

6. A vehicle of the character described for transporting portable freight containers having longitudinal fork receiving elements therein comprising in combination, a chassis defining a load supporting surface, a mast structure mounted for movement on said chassis, means for moving said mast structure longitudinally relative to said chassis, load engaging forks mounted for movement on said mast structure, means having axes extending longitudinally of said vehicle for supporting said load engaging forks from said mast structure for arcuate movement substantially transverse of said vehicle, means for moving said load engaging forks vertically relative to said mast structure so as to straddle said load supporting surface, said load engaging forks engaging the fork receiving elements on said freight containers upon movement thereof longitudinally of said chassis and elevating said containers upon movement thereof vertically relative to said mast structure for depositing same upon said load supporting surface, and means for continually urging said forks arcuately into engagement with said containers for stabilizing same upon said load supporting surface during transport by said vehicle.

7. A transporting vehicle of the character described comprising in combination, a chassis defining a load supporting surface and including a pair of longitudinal frame members, a pair of shoe elements adapted and arranged for movement upon said frame members, means for moving said shoe elements forwardly and rearwardly relative to said frame members, a mast structure secured to said shoe elements and movable therewith, means for pivotally moving said mast structure relative to said shoe elements about an axis extending transversely of said vehicle, a pair of load engaging forks mounted for movement upon said mast structure, means connected to said mast structure having axes extending longitudinally of said chassis for pivotally supporting said forks from said mast structure, means for pivoting said forks about said axes, and means for moving said forks vertically relative to said mast structure in positions straddling said chassis, said forks being also movable with said mast structure longitudinally of said chassis while located in said chassis straddling position.

8. A vehicle of the character described for handling a portable freight container having latching means thereon comprising in combination, a chassis, a mast structure mounted for movement on said chassis, load engaging forks, means for supporting said forks on said mast for vertical movement thereon and pivotal movement relative thereto about longitudinally extending axes, means for moving said mast structure and load engaging forks relative to said chassis with said forks located in positions straddling said chassis whereby said forks may engage the freight container when located in close proximity to said chassis, anchoring means on said chassis for engaging the latching means on the container, and means on said load engaging forks for automatically operating the latching means upon transverse movement into engagement with the latching means.

9. A vehicle of the character described for handling a portable freight container having latching means thereon comprising in combination, a chassis, a single mast structure mounted for movement on said chassis, load engaging forks, means for mounting said forks on said mast for vertical movement thereon and pivotal movement about axes extending longitudinally of said chassis, means for moving said mast structure and load engaging forks relative to said chassis with said forks located in position straddling said chassis whereby said forks may engage said freight container when located in close proximity to said chassis, anchoring means on said chassis for engaging said latching means on said container, and means on said load engaging forks for automatically operating said latching means upon transverse movement of said forks relative to said container into engagement with said latching means.

10. A vehicle as set forth in claim 3 wherein the load engaging fork tines each includes a horizontally extending portion, said portions being actuatable by said fork pivoting means to a position below and laterally within the sides of said load supporting surface.

References Cited by the Examiner

UNITED STATES PATENTS

| Re. 23,546 | 9/1952 | Dempster | 214—75 |
| 2,053,969 | 9/1936 | Olds | 220—1.5 X |
| 2,601,933 | 7/1952 | Seagraves et al. | 214—653 |
| 2,667,985 | 2/1954 | Woughter | 214—670 |
| 2,752,056 | 6/1956 | Lull | 214—660 |
| 2,807,383 | 9/1957 | Scheltens | 214—731 |
| 2,897,985 | 8/1959 | Carlson et al. | 214—75 |
| 2,898,872 | 8/1959 | Hastings | 214—38.46 X |

FOREIGN PATENTS 667,215    2/1952    Great Britain.

GERALD M. FORLENZA, *Primary Examiner.*

HUGO O. SCHULZ, ERNEST A. FALLER, *Examiners.*